United States Patent [19]
Engstrom

[11] 3,741,518
[45] June 26, 1973

[54] RELIEF VALVE MECHANISM FOR FLUSHOMETERS

[76] Inventor: Oscar L. Engstrom, 35 Bond Street, Long Island, N.Y. 10012

[22] Filed: Oct. 20, 1971

[21] Appl. No.: 190,771

[52] U.S. Cl. .................................. 251/44, 251/33
[51] Int. Cl. ......................................... F16k 31/383
[58] Field of Search ................... 251/44, 45, 43, 33

[56] References Cited
UNITED STATES PATENTS

| | | | |
|---|---|---|---|
| 1,813,709 | 7/1931 | Pasman | 251/43 X |
| 1,876,223 | 9/1932 | Hagey | 251/43 X |
| 1,735,244 | 11/1929 | Handy | 251/44 |
| 2,998,221 | 8/1961 | Engstrom | 251/44 |

*Primary Examiner*—Arnold Rosenthal
*Attorney*—Ernest H. Schmidt

[57] ABSTRACT

A manually actuated relief valve member particularly suitable for temporarily relieving or "bleeding" a pressure head in flush valves or flushometers for instituting a flushing cycle therein, is described. An actuating handle controls operation of a rod member slidably arranged within a valve body member and having at its inner (high pressure) end a circular washer seatable upon an annular valve seat at the inner end of the valve body member. A first water flow passageway leading to the high pressure end of the release valve mechanism is such as to present greater resistance or impedance to water flow than a second water release passageway leading from the low pressure end of the relief valve mechanism so that substantially no pressure head can develop between the high and low pressure ends, (inner and outer ends) of the valve body member, thereby substantially eliminating leakage to the outer end of the valve body member and preventing leakage at the handle without the use of packing glands and the like.

5 Claims, 3 Drawing Figures

PATENTED JUN 26 1973

3,741,518

INVENTOR.
OSCAR L. ENGSTROM
BY Ernest H. Schmidt
ATTORNEY 3,741,518

RELIEF VALVE MECHANISM FOR FLUSHOMETERS

This invention relates to flush valves or flushometers of the type used with wash basins, water closets, showers, urinals, and other plumbing installations, and is directed particularly to an improved pressure relief valve mechanism for such flush valves.

In my U.S. Pat. No. 2,998,221, issued Aug. 29, 1961, I describe an anti-syphonic flush valve having a large and unrestricted outlet or discharge waterway in which the path of water discharge is controlled by valve mechanism devoid of springs, diaphragms, sliding pistons, or cup diaphragms. In operation of the flush valve, water inlet pressure effective to normally retain a main valve head member forcefully seated against a main valve seat is temporarily released by means of a manually-actuated relief valve mechanism, whereupon a flushing cycle is instituted under the influence of greater differential water pressure being applied beneath the main valve head member, to unseat it and thereby temporarily permit flushing water under pressure to be discharged through the discharge waterway. The relief valve mechanism, after being manually actuated, automatically assumes its closed or sealing position again, with the result that inlet water pressure gradually builds up above the main valve head member to a greater downward pressure than that exerted upwardly from below, whereupon said main valve head member is forced again into seating engagement against the main valve seat to complete the flushing cycle. It is the principal object of this invention to provide a novel and improved pressure relief valve mechanism for flush valves of the character described which will be simpler and more effective than comparable mechanisms heretofore devised.

It is a more particular object of the invention to provide a pressure relief valve mechanism of the character described wherein the release passageway to the inlet of the relief valve mechanism presents a greater impedance to flow than the discharge passageway thereof, so that substantially no back pressure will occur at the low pressure side of the valve mechanism, thereby obviating the need of packing glands or the like to prevent water leakage at the actuating lever or handle upon actuation of the valve.

Another object of the invention is to provide a pressure relief valve mechanism of the above nature wherein the valve body member can readily be fabricated of a synthetic plastic material such as "Nylon", "Teflon", or the like for economy, durability, and trouble free operation over a long period of time.

Other objects, features, and advantages of the invention will be apparent from the following description when read with reference to the accompanying drawings. In the drawings, wherein like reference numerals denote corresponding parts throughout the several views.

Figure 1:
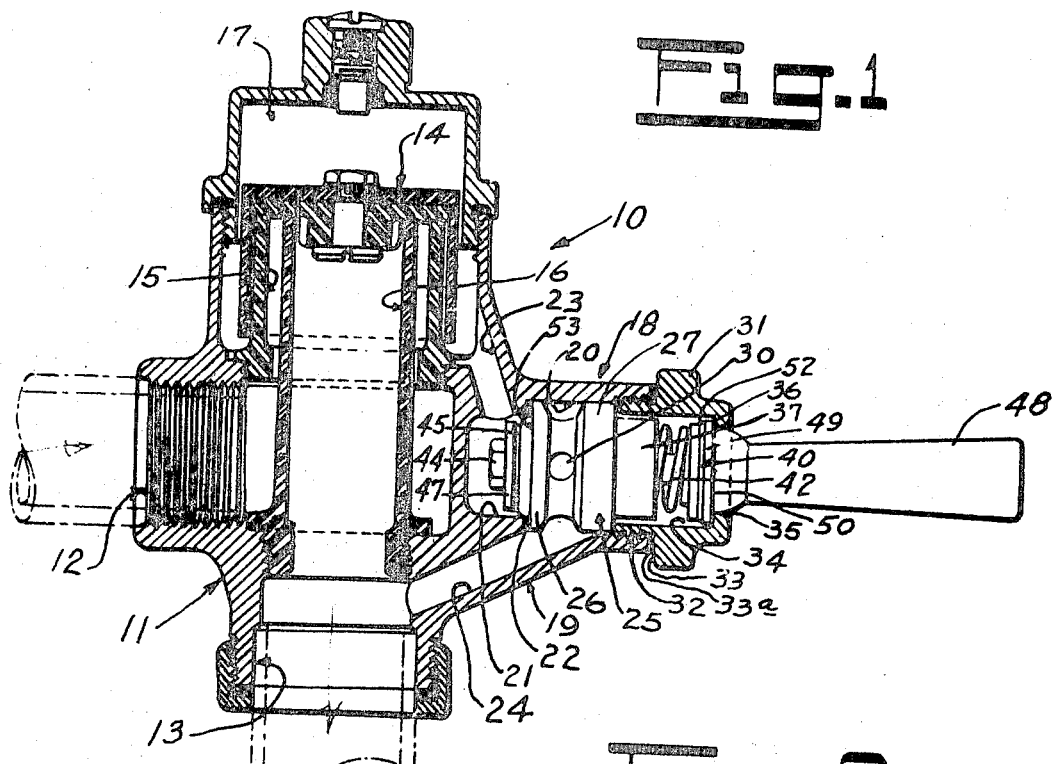
FIG. 1 is a vertical cross-sectional view of a flush valve or flushometer embodying my improved relief valve mechanism.

Referring now to the drawings, reference numeral 10 indicates generally, a typical flush valve embodying my invention, the same comprising a housing 11 having an inlet opening 12 for connection with a pressurized water supply and an outlet opening 13 for the discharge of flush water. The flush valve also comprises a main valve head member 14 seatable down upon the upper ends of inlet and outlet conduits 15 and 16, respectively. The differential water pressure within the pressure chamber 17, which is normally exerted upon the upper surface of the main valve head member 14, maintains said main valve head member in sealing engagement with the outlet conduit 16. Upon the relief of water pressure in the chamber 17 by means of the relief valve mechanism, generally indicated at 18, the pressure of supply water applied between the inlet and outlet conduits 15 and 16 against the underside of the main valve head member 14 will be greater than that applied from above said main valve head member, whereupon it will rise within the pressure chamber 17 to permit flushing water under supply pressure to be discharged through the outlet opening 13. Since the present invention is directed only to the relief valve mechanism 18 for instituting flushing action in the flush valve 10, only said relief valve mechanism is described in greater detail herein. While a more detailed description of the above-described flushing valve mechanism is not deemed to be necessary for full understanding of the present invention, reference can be had to applicant's above referred to U.S. Pat. No. 2,998,221 for a detailed description.

The housing member 11 is integrally formed, opposite the water inlet opening 12, with a sidewardly-extending, generally cylindrical housing portion 19 having a lateral bore 20 which, at its inner end, communicates with a reduced-diameter, concentric bore 21, blind at its inner end. The transition zone between the bores 20 and 21 defines an annular shoulder against which an annular gasket 22 is seated. The housing member 11 is also provided with a first pressure release passageway 23 communicating between the valve pressure chamber 17 and the chamber defined by the bore 21, and a second pressure release passageway 24 communicating between the outlet opening 13 and the lateral bore 20 in the sidewall portion thereof.

Received within the bore 20 is a relief valve body member 25, having at its inner end an annular portion 26 which is firmly seated in sealing engagement against the gasket 22 by means hereinafter described. The outer end of the valve body member 25 is formed with a cylindrical flange portion 27 closely fitted within the bore 20. The relief valve body member 25 is also formed, at its inner end, with a coaxial cylindrical recess 28, and has an annular groove 29 between the annular portion 26 and the flange portion 27 thereof, said annular groove communicating with said cylindrical recess through a plurality of radial openings 30.

Means as provided for removably securing the relief valve body member 25 in fixed relation against the gasket 22 as described above. To this end, a retainer cap member 31 is provided, said retainer cap member being formed with an externally-threaded skirt portion 32 cooperatively received within an internally-threaded outer end portion of the lateral bore 20 comprising housing portion 19. The externally-threaded skirt portion 32 defines an annular shoulder portion 33 of the retainer cap member 31, against which is seated an annular gasket 33a. When screwed firmly into place, the terminal end of the externally-threaded skirt portion 32 of the retainer cap member 31 seats down upon a peripheral outer end portion of the relief valve body member flange portion 27 to firmly seat said valve body member against the gasket 22, while at the same time seating said cap member against the outer end of the housing portion 29 through gasket 33a. The retainer cap member 31 is also provided with a coaxial cylindrical recess 34 extending inwardly of the skirt portion 32 thereof to a distance just short of the outer end of said cap member, whereat it communicates with a coaxial, reduced-diameter through opening 35 defining therewith an interior annular shoulder 36.

The relief valve body member 25 is also integrally formed with a concentric, reduced-diameter, cylindrical portion 37 extending outwardly of flange portion 27. The flange portion 27 and reduced-diameter portion 37 of the relief valve body member 25 are formed with a concentric through bore 38, of substantially lesser diameter than that of cylindrical recess 28.

Slidably received within the bore 38 of the relief valve body member 25 is an actuating rod 39, the outer end of which has secured thereto a circular head member 40, such as by peening, as indicated at 41. The underside of the head member 40 serves to retain the outer end of a helical compression string 42 circumjacently disposed with respect to the reduced-diameter portion 37 of relief valve body member 25, the inner end of which spring is constrainingly seated within an annular recess 43 provided in the relief valve body member flange portion 27.

A washer retaining machine screw 44 receivable within a threaded opening at the inner end of the actuating rod 39 retains an annular sealing washer 45 clamped between a metal inner retainer washer 46 of lesser diameter than cylindrical recess 28 of relief valve body member 25 and metal outer retainer washer 47 of somewhat greater diameter than that of sealing washer 45.

Figure 2:
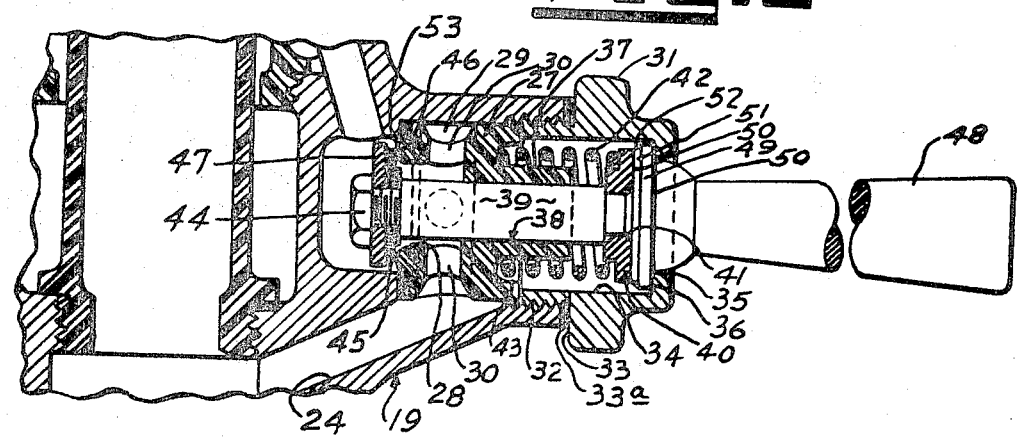
FIG. 2 is a partial view of the flush valve illustrated in FIG. 1, on an enlarged scale and in vertical cross-section, illustrating mechanical details of the relief valve mechanism.
Figure 3:
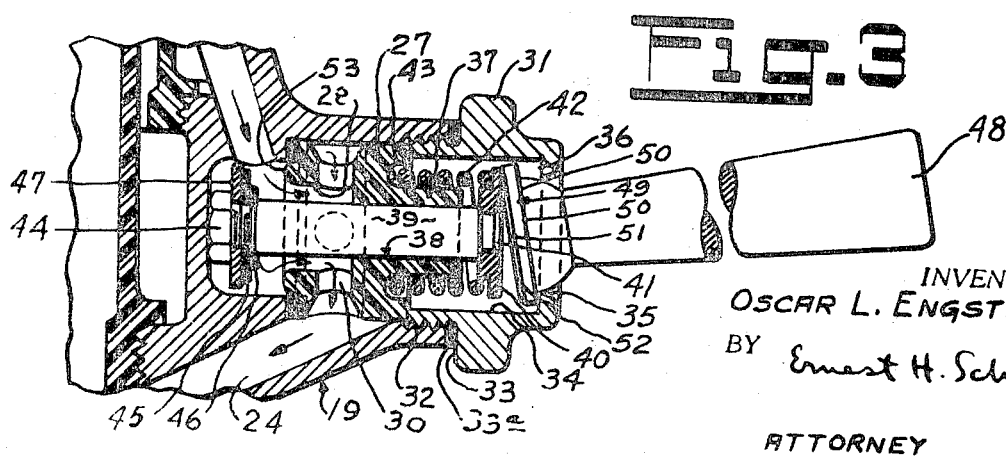
FIG. 3 is a cross-sectional view, similar to that of FIG. 2 but showing the valve in manually actuated condition for beginning a flushing cycle.

A lever handle 48 extends outwardly through the reduced-diameter opening 35 of the retainer cap member 31, said lever handle being formed at its inner end with an increased-diameter flange portion 49 defining an outwardly-directed annular shoulder 50 which is normally retained in seating engagement against the internal annular shoulder 36 of the retainer cap member 31. The outer end of the flange portion 49 is defined by a flat, transverse cam surface 51 having a peripheral bevel 52. As best illustrated in FIGS. 2 and 3, the inner end of the relief valve body member 25, inwardly of the annular portion 26 thereof, is provided with a rounded annular valve seat portion 53 for seating thereagainst of the underside of washer 45. As illustrated in FIG. 2, the length of the actuating rod 39 is just such that when the head member 40 is constrained to its limit position against the cam surface 51 of the lever handle 48, under the influence of compression spring 42, the washer 45 at the innermost end of said actuating rod will be positioned in sealing engagement against the annular valve seat 53.

In operation, momentary sidewise pushing of the lever handle 48 (See FIG. 3) will cant the flange portion 49 thereof inwardly, whereupon the head member 40 at the outer end of actuating rod 39 will be moved inwardly against the reactive resiliant force of the compression spring 42. As a result, annular washer 45 will be moved away from its valve seat 53, to allow water under pressure within the flush valve pressure chamber 17 to be instantly released through the first pressure release passageway 23, the cylindrical recess 28 in relief valve body member 25, the openings 30 and the annular groove 29 therein to discharge through the second pressure release passageway 24 emptying into the outlet opening 13 of the flush valve. This instantaneous release of pressure causes the main valve head member 14 to rise practically instantaneously to its full extent within the pressure chamber 17 under the force of inlet water under pressure emerging from the annular space between the outlet and inlet conduits 16 and 15, respectibly, thereby initiating flushing action through the large and restricted water discharge passageway afforded by the outlet conduit 16. During the flushing cycle a portion of the water will pass through the space between the outer surface of the inlet conduit 15 and the inner surface of the sleeve portion of the main valve head member 14, and around said main valve head member to enter the pressure chamber 17 and gradually again increase the water pressure therein above said main valve head member, finally forcing it down again against the valve seat formed by the upper end of the outlet conduit 16, where it will become firmly seated by the time inlet pipe pressure is reached above said main valve head member to terminate the flushing cycle.

In connection with the operation of the relief valve mechanism 18, it is to be particularly noted that the first pressure release passageway 23 is of lesser diameter than that of the second pressure release passageway 24 and thus presents a greater impedance to the flow of water therethrough than does said second pressure release passageway. It is further to be noted that the four openings 30 in the relief valve body member 25, and the annular groove 29 therein through which the "bleed" or the pressure relief water passes through to the second pressure release passageway 24 when the lever handle 48 is actuated as described above, are of great enough size to permit release water passage therethrough at a more rapid rate as compared with flow through the first pressure release passageway 23. As a result, during the pressure release cycle of operation substantially no fluid back pressure can build up within the annular groove 29 of relief valve body member 25. For this reason, any possible water leakage along the outer periphery of the flange portion 27 of the relief valve body member 25, and along the interface between the axial bore 38 of said valve body member and the actuating rod 39 is substantially eliminated. The above described relief valve construction, therefore, is not only simpler and less expensive in construction, but also, because of not requiring packing glands and the like to prevent water leakage at the inner end of the actuating handle 48, is substantially maintenance free.

While I have illustrated and described herein only one form in which my invention can be conveniently embodied in practice, it is to be understood that this embodiment is presented by way of example only and not in a limiting sense. Thus, while I have illustrated and described herein an improved relief valve mechanism wherein comparatively greater flow impedance to the high pressure side of the valve mechanism as compared with the flow impedance from the low pressure side thereof is achieved by the use of cylindrical passageways of different diameters, such difference in flow resistance to and from the valve mechanism could also be achieved in other ways, as by the use of flow impeding baffles or the like in the passageways, or by the use of flow passageways having same diameter, but having different overall lengths. The invention, in brief, comprises all the embodiments and modifications coming within the scope and spirit of the following claims.

What I claim as new and desire to secure by Letters Patent is:

1. An improved relief valve mechanism for flush valves and the like of the type having a housing, an inlet opening in the housing for the supply of water under pressure, an outlet conduit for the discharge of flush water, and a main flush valve in a path of communication between the supply opening and the outlet opening and having a movable main valve head member normally retained in valve-closing position with respect to a valve seat by water pressure applied through a housing pressure chamber upon the valve head member, and wherein a flushing cycle is initiated by temporarily relieving the pressure in the pressure chamber by means of a pressure relief valve mechanism, wherein the improvement in the relief valve mechanism comprises, a housing portion forming part of the flush valve housing and defining an outwardly extending cylindrical bore having an inner end and an outer end, a cylindrical relief valve body member slidingly received within said bore, in close fitting relation with respect thereto, an annular valve seat at the inner end of said valve body member and communicating with a recess within said inner end of said valve body member, a valve washer normally seated against said annular valve seat for sealing against the flow of fluid into said recess, a first fluid flow passageway communicating between the flush valve pressure chamber and an opening in said housing portion inwardly of said valve body member and said valve washer, a second fluid flow passageway communicating between a sidewall opening in said cylindrical bore and the outlet conduit of the flush valve, fluid flow passageway means in said relief valve body member communicating between said recess therein and said sidewall opening, manually controlled means for temporarily unseating said valve washer with respect to said annular valve seat, the impedance to fluid flow through said first fluid flow passageway being substantially greater than the impedance to fluid flow through said second fluid flow passageway and said fluid flow passageway means in said relief valve to prevent back pressure at the inner end of said valve body member upon actuation of said manually controlled valve washer unseating means, said fluid flow passageway means in said relief valve body member comprising an annular groove in said body member near the inner end thereof and a plurality of radial openings communicating between said groove and said recess, said annular groove being in registration with said sidewall opening, said manually controlled means for temporarily unseating said valve washer comprising an actuating rod slidably fitted within an axial bore in said relief valve body member, said valve washer being affixed at the inner end of said actuating rod, means for resiliantly constraining said actuating rod in outermost position with respect to said relief valve body member for seating said valve washer against said annular valve seat, and handle means for pushing inwardly directly upon the outer end of said actuating rod for temporarily unseating said valve washer.

2. The improvement as defined in claim 1 wherein said means for resiliantly constraining said actuating rod in outermost position with respect to said relief valve body member comprises a head member affixed to the outer end of said actuating rod, and a helical compression spring surrounding said actuating rod and constrained between an underside portion of said head member and an outer end portion of said relief valve body member.

3. The improvement as defined in claim 2 wherein said handle means comprises a handle lever having an increased-diameter flange portion at one end normally sated against the outer end of said head member, and means constraining a peripheral outer end portion of said lever handle flange portion against outward movement with respect to said actuating rod so that the underside of said flange portion will be canted inwardly in sliding disposition against outer surface of said head member for pushing inwardly upon said actuating rod when said lever handle manually pushed to one side or another.

4. The improvement as defined in claim 3 wherein said lever handle flange portion constraining means comprises a retainer cap member removably secured against the outer end of said cylindrical bore and having an inner end extending inwardly with respect to said cylindrical bore, said retainer cap member having a cylindrical recess for the reception of the flange portion end of said lever handle and defining an interior annular shoulder for the seating of said peripheral outer end portion of said flange portion.

5. The improvement as defined in claim 4 including means for removably securing said relief valve body member within said bore, said securing means comprising an annular shoulder at the inner end of said bore, and abutment means at the inner end of said retainer cap member adapted to clamp said relief valve body member against said annular shoulder.

* * * * *